United States Patent [19]

Laroche et al.

[11] Patent Number: 4,465,734

[45] Date of Patent: Aug. 14, 1984

[54] COMPOSITE MIRROR PANELS

[75] Inventors: Pierre Laroche, Ham-sur-Heure; François Toussaint, Montigny-le-Tilleul, both of Belgium

[73] Assignee: Glaverbel, Brussels, Belgium

[21] Appl. No.: 374,907

[22] Filed: May 4, 1982

[30] Foreign Application Priority Data

Aug. 21, 1981 [GB] United Kingdom ............... 8125666

[51] Int. Cl.³ .................................................. B32B 5/20
[52] U.S. Cl. ................................. 428/317.1; 52/309.5; 52/309.11; 52/573; 52/786; 156/79; 156/91; 156/222; 156/245; 248/549; 264/46.5; 350/288; 428/99; 428/215; 428/318.4; 428/912.2
[58] Field of Search ............... 46/135 R, 151, 156; 52/309.11, 573, 786, 309.51; 156/79, 91, 212, 222, 245; 248/549; 264/46.5, 46.6; 350/288; 428/99, 71, 215, 317.1, 318.4, 912.2

[56] References Cited

U.S. PATENT DOCUMENTS

| | | | |
|---|---|---|---|
| 2,978,958 | 4/1961 | Dover ................................... | 52/786 |
| 3,383,152 | 5/1968 | Ward ............................... | 350/288 X |
| 3,448,553 | 6/1969 | Herr et al. ...................... | 350/288 X |
| 4,325,178 | 4/1982 | Pruehs ........................... | 264/46.5 X |

FOREIGN PATENT DOCUMENTS 2048166 12/1980 United Kingdom .

Primary Examiner—Robert A. Dawson
Attorney, Agent, or Firm—Spencer & Frank

[57] ABSTRACT

A method of manufacturing a composite which includes a mirror panel comprising the steps of water-tightly bonding a first backing sheet made of waterproof material to the rear side of a mirror including a vitreous sheet bearing a radiation-reflecting coating on its rear side, thereby forming a mirror/backing sheet laminate; locating the laminate and a second backing sheet between a pair of dies with the laminate and the second backing positioned in spaced relationship; injecting the space between the laminate and the second backing sheet with a foamable plastic material; allowing or causing the foamable plastic material to foam and thereby press the laminate and the second backing sheet into close conformity with the respective die faces and, allowing or causing the foam to set and adhere to each backing sheet while the laminate and second backing sheet are pressed against the die faces to form a substantially rigid composite sandwich structure.

25 Claims, 4 Drawing Figures

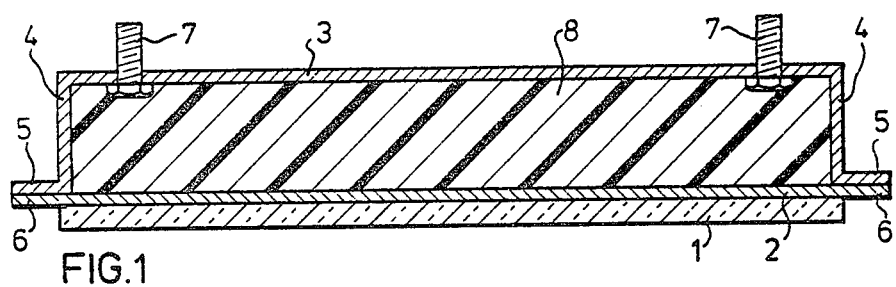
FIG.1
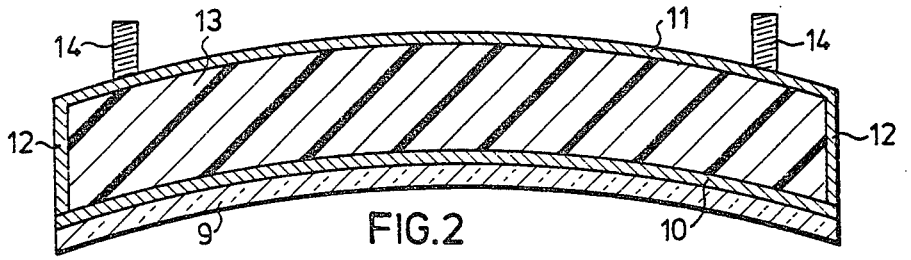
FIG.2
FIG.3
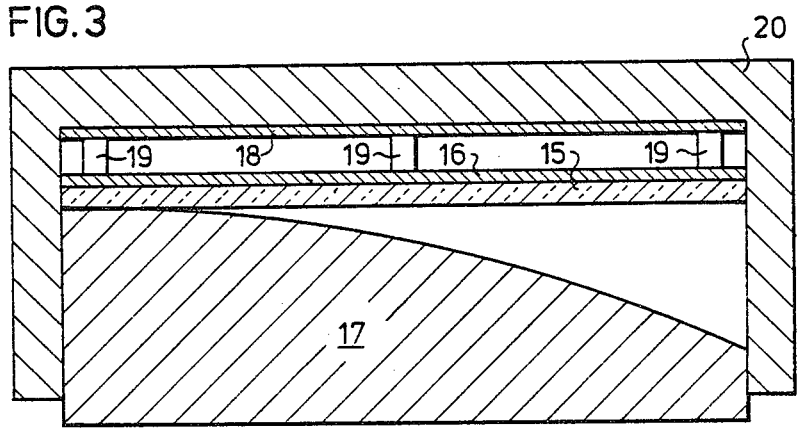

COMPOSITE MIRROR PANELS

BACKGROUND OF THE INVENTION

This invention relates to composite mirror panels and the manufacture of composite mirror panels.

Composite mirror panels are useful for many purposes and an increasing use is being found in the field of solar energy collectors.

In one form of solar energy transducing installation, mirrors are held on supports distributed around a field. Each support may carry mirrors several square meters in area and there may for example be a hundred or more supports distributed around a field up to a few hectares in area. All the mirrors are arranged to reflect solar energy onto for example an energy collecting surface of a steam generator arranged to drive a turbo-generator. So that the mirrors can continue to reflect sunlight onto the energy collecting surface as the sun moves across the sky, the mirror supports incorporate means for adjusting the orientations of the mirrors about vertical and horizontal axes. The combination of such a mirror and support is known as a heliostat. Such mirrors may be flat or curved.

The efficiency and cost of such a solar energy transducing installation will depend on a number of factors, inter alia, the properties of the heliostat mirrors.

It is clearly desirable that a solar mirror should have a high reflectivity, and that such reflectivity should be preserved against weathering to give the mirror a long useful life. It is also desirable that the mirror should be light in weight because a low inertia makes it easier to track the sun and the cost of the heliostat support can be reduced. However to ensure that the mirror is capable of continuously reflecting sunlight onto a collector surface the mirror must be substantially rigid. A heliostat mirror may, e.g. be located a hundred meters or more away from the collector, in which case even quite minor movement or deformation of the mirror due to wind gusts would deflect the reflected sunlight away from the collector surface.

Composite mirror panels which are light, rigid and weatherproof are also useful for other purposes, for example as building panels.

It is known to make mirror panels of foam sandwich construction but the methods of construction hitherto proposed do not enable product standards now often demanded, to be reliably met. In particular, problems arise in achieving a high optical and mechanical integrity of the composite structure together with accurate conformity with prescribed dimensional specifications.

SUMMARY OF THE INVENTION

It is an object of the present invention to provide a method whereby light-weight, composite mirror panels of foam sandwich construction and satisfying high standards of accuracy and resistance to optical deterioration by weathering can be reliably produced under industrial conditions.

According to the present invention there is provided a method of manufacturing a composite mirror panel characterised in that it comprises the following steps:

water-tightly bonding a waterproof backing sheet (hereafter called "first backing sheet") to the rear side of a mirror which comprises a vitreous sheet having a radiation-reflecting coating on its rear side, thereby forming a mirror/backing sheet laminate;

locating such laminate and a second backing sheet between a pair of dies with the said laminate and said second backing sheets in spaced relationship;

injecting the inter-sheet space with a foamable plastics material;

causing or allowing that material to foam and thereby press the laminate and said second backing sheet into close conformity with the respective die faces and, while such laminate and second backing sheet are pressed against the die faces, causing or allowing the foam to set and adhere to each said backing sheet to form a substantially rigid composite sandwich structure.

Light-weight foam sandwich panels are conventionally made by forming adherent skins on a preformed foam ply. The step of foaming plastics material in situ and while the sandwiching plies are located between dies which determine their final positions and orientations involves a marked departure from the said prior practice, and affords important benefits. The said in situ foaming, by forcing the outer plies of the panel into close conformity with the die faces, ensures a correct geometry of the final product and is highly conducive to strong and reliable bonding of its constituent elements. The method is useful for forming panels of various surface profiles, determined by the dies. The benefits of the process are particularly important in the manufacture of panels incorporating curved mirrors.

The laminating of the mirror to the first backing sheet prior to the production of the foam sandwich is in itself advantageous because it reduces the risk of breakage of the vitreous sheet during formation of the sandwich. Such risk is appreciable when a thin vitreous sheet of large area is used. The production of the said laminate prior to its use in the formation of the foam sandwich is also beneficial because it enables separate attention to be given to the highly important bond between the mirror and the first backing sheet. In the finished product, the first backing sheet protects or assists in protecting the reflective coating against deterioration due to weathering.

The field of primary interest for employment of the present invention is that of solar reflectors and particularly solar concentrators, that is, concavely curved solar reflectors.

Preferably said vitreous sheet has a thickness of at most 1.5 mm. In addition to promoting lightness of the panel, this feature has the advantage of enhancing reflectivity of the panel since the light path through the vitreous material will be shorter than when thicker sheets are used so that less energy is absorbed by the vitreous sheet, and the perceptibility of double images due to reflection from the front and back surfaces of the vitreous sheet is also reduced.

Advantageously each said backing sheet is selected so that it has a Young's modulus of elasticity of at least 10 and preferably at least 50 $GN/m^2$. This promotes rigidity of a composite sandwich structure formed in accordance with the invention. In addition, the use of such a sheet as the first backing sheet is advantageous for ensuring good support and protection against breakage to the vitreous sheet during handling preparatory to and during its location between the dies and the foaming and setting of the plastics.

The backing sheets can be made of various waterproof materials, for example, fibre-reinforced plastics materials, especially glass-fibre-reinforced plastics materials. The backing sheets may be of the same or different materials, although for convenience they are preferably of the same materials.

Preferably at least said first backing sheet is a metal sheet. The metal used may, for example, be aluminium or an aluminium alloy, but advantageously the or at least one said metal backing sheet is of steel, preferably galvanised steel to protect it against corrosion. Further protection against corrosion may be given by applying other protective coatings to metal sheets when used; for example, the outer face of the second backing sheet, where this is of steel, may be coated with a silicone polyester.

To provide a good compromise between strength and weight, the or at least one said metal sheet preferably has a thickness in the range 0.5 to 1.0 mm.

In the most preferred embodiments of the invention said vitreous sheet and the first backing sheet are bonded together to form a flat laminate. It is very much simpler to form a flat laminate than a curved laminate.

The formation of such a flat laminate is useful not only in the production of a flat foam sandwich panel but also (provided the laminate is suitably composed) in the production of curved mirror panels. Curved mirror panels, for example, cylindrically or parabolically curved mirror panels are particularly important for use as solar concentrators.

In preferred embodiments of the invention a composite panel incorporating a curved mirror is manufactured by first making a mirror/backing sheet laminate, with the laminate sheets being so selected and bonded together that the laminate can be safely flexed to a curved or more curved condition as required in the final product.

Preferably the laminate sheets are so selected and bonded together that the neutral bending surface of the laminate lies outside the thickness of the vitreous sheet when the laminate is flexed within the elastic limits of its sheets to form a concave or more concave reflector. It is especially preferred to form a said laminate which is inherently flat for use as a component in the manufacture of a composite panel in which such laminate is held in flexed condition.

Flat laminates produced as above referred to can be used as standard components in the manufacture of both plane reflectors and concave reflectors of the same or different focal lengths. This is of considerable importance in practice in enabling a greater standardisation of production.

Because the neutral bending surface of the laminate lies outside the thickness of the vitreous sheet, that sheet will be subjected to compression forces and not tensile forces when the sheet is so flexed. As is well known, vitreous materials are generally able to withstand compressive forces better than tensile forces without breaking.

One especially preferred way of making such a flexible laminate is to constitute it as a flexible radiant energy reflector as described in published British Patent Application specification GB No. 2 042 761A whose disclosure is specifically incorporated into this specification.

Preferably the foamable material is such as to give rise to a closed cell foam. In this way the ingress of water into the foam body is strongly inhibited.

The foamable materials used may be of any kind that will give rise to a foam with suitable properties but is preferably such as to give rise to a polyurethane foam. Such materials are widely available.

Preferably the density of the foam layer formed is between 50 and 80 preferably between 60 and 80 kg/m$^3$. Alternatively, or in addition, the foam when set advantageously has a compressive strength at 10% deformation of at least 50 N/cm$^2$ and its said compressive strength is preferably not more than 200 N/cm$^2$. These features give rise to adequate rigidity of the panel without making it unnecessarily heavy, and in particular they allow the achievement of a good and effective compromise between the weight of the panel and its resistance to flexure due to wind pressure.

The thickness of the foam layer formed is preferably between 30 and 55 mm. This gives a good compromise between strength and ease of handling.

Preferably, at least one said backing sheet is primed to promote adhesion of the foamed plastics material. This is especially valuable in the case when one or both backing sheets is or are of metal. The primer used is preferably an epoxy resin.

The backing sheets are preferably held in spaced relation, prior to the injection of said foam, by one or more spacer members. This provides a convenient intersheet space for the injection of foamable plastics material. Such spacer members are preferably attached to the second backing sheet alone, so that they may separate from the first backing sheet as the foam pressure builds up during formation of the composite sandwich structure formed. This avoids risk of the mirror being distorted by stresses transmitted by the spacer members.

Advantageously, prior to injection of the foamable material the laminate and the second backing sheet are held spaced apart by lips formed at margins of at least one of the backing sheets. This is very convenient and does not require the use of any additional spacer members. Preferably the said backing sheets and lips form a box structure (which may be open-ended). In this way, the lips can also serve to keep the foamable material in place during foaming.

Advantageously means for mounting the panel to a support are attached to the second backing sheet. For example studs or nuts may be attached to the rear face of the backing sheet. Preferably, however, means for mounting the panel to a support are embedded in said foam to bear on the front face of said second backing sheet. Again, such mounting means should not be directly attached to the first backing sheet. By way of example, in some preferred embodiments of the invention spacer members attached to the second backing sheet are formed either with threaded holes for the reception of studs or bolts which project through the second backing sheet, or the spacer members are themselves formed with such studs.

The invention includes a composite mirror panel constructed by a method according to any preceding definition, and extends to a composite mirror panel characterised in that it comprises a vitreous sheet having a waterproof backing sheet (called "first backing sheet") water-tightly bonded to a reflectively coated face thereof and a body of foamed plastics material sandwiched between and adherent to said first backing sheet and a second backing sheet to form a substantially rigid sandwich structure. This provides a light rigid mirror whose reflective surface is well protected from weathering.

A said mirror according to the invention preferably incorporates one or more of the following optional features whose particular advantages will be readily inferred from the advantages recited above in respect of corresponding features of the method:

said vitreous sheet has a thickness of at most 1.5 mm;

each said backing sheet has a Young's modulus of elasticity of at least 10 and preferably at least 50 GN/m$^2$;

at least said first backing sheet is a metal sheet;

at least said first backing sheet is of steel, preferably galvanised steel;

at least said first backing sheet has a thickness in the range 0.5 mm to 1.0 mm;

said vitreous sheet and the first backing sheet bonded thereto form a laminate which is flat or which would be flat if the foam and said second backing sheet were removed;

said vitreous sheet and said first backing sheet bonded thereto form a laminate which is inherently (i.e. in the absence of said foam and second backing sheet) a flexible laminate whose neutral bending surface lies outside the thickness of the vitreous sheet when the laminate is flexed within the elastic limits of its component sheets to form a concave or more concave reflector;

the foam is a closed cell foam;

the foam is polyurethane foam;

the foam has a density between 50 and 80 and preferably between 60 and 80 kg/m$^3$;

the foam has a compressive strength at 10% deflection of at least 50 N/cm$^2$;

the foam has a compressive strength at 10% deflection of at most 200 N/cm$^2$;

the thickness of the foam layer is between 30 and 55 mm;

the two backing sheets are joined together at their edges to form a box (which may be open-ended);

the two backing sheets are joined to form the box by lips formed by margins of at least one sheet;

the mirror of the panel is concavely curved;

means for mounting the panel to a support are embedded in said foam to bear on the front face of said second backing sheet;

In the most preferred embodiments of panel according to this invention, said panel mounting means are only indirectly connected to said first backing sheet. This reduces the risk of high local stresses, which could deform the first backing sheet, being transmitted to it directly.

The invention is particularly useful in its embodiments in which the mirror of the panel is concavely curved.

The invention includes a solar energy collector characterised in that it comprises at least one mirror panel as herein defined. Such a mirror panel is preferably mounted in a heliostat.

BRIEF DESCRIPTION OF THE DRAWINGS

Examples of panels according to the invention will now be described in greater detail with reference to the accompanying diagrammatic drawings in which:

FIGS. 1 and 2 are respective sectional views of two composite mirror panels in accordance with the invention;

FIG. 3 shows a stage in the manufacture of a composite mirror panel; and

DESCRIPTION OF THE PREFERRED EMBODIMENTS

Figure 4:
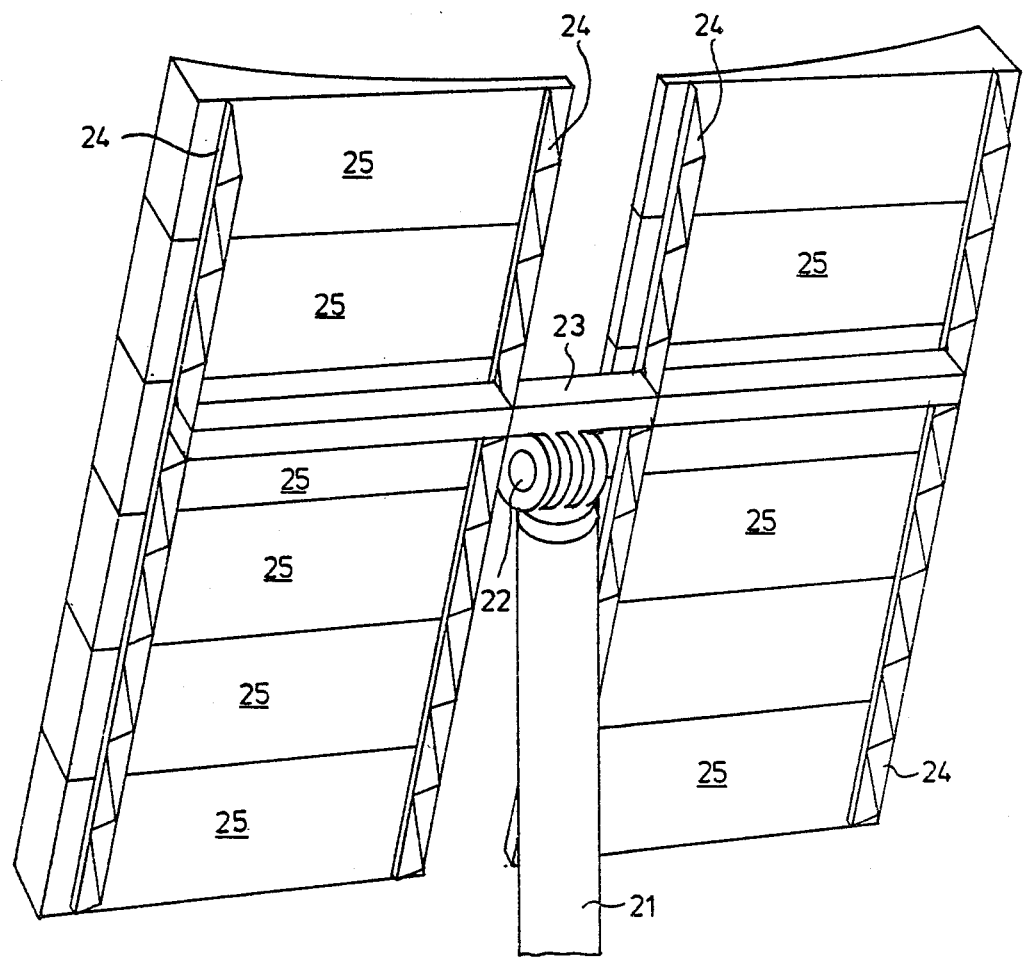
FIG. 4 shows a heliostat support-mounting mirror panels in accordance with the invention.

In FIG. 1, a glass ply 1 has a rear face which is reflectively coated, e.g. with silver, in known manner and this rear face is bonded to an oversized sheet 2 of waterproof backing material such as a metal to form a laminate.

In a specific example, this laminate was made by bonding a ply 1 of ordinary untempered glass, 0.75 mm in thickness, to a metal ply 2 formed of galvanised steel and having a thickness of 0.67 mm. Prior to such bonding, the glass ply 1 was provided with a light-reflecting coating of silver, a protective coating composed of a layer of copper and a layer of protective paint as used in conventional mirror production (none of which is shown in the drawing).

The coated glass ply 1 and the metal ply 2 were bonded together by a layer of an epoxy-based adhesive marketed under the Trade Mark "ARALDITE" by Ciba. It was found that the laminate could be flexed within the elastic limit of the metal to impart to the front face of the glass ply a concave curvature with a radius as small as 18.5 cm without breakage of the glass. Continued flexing beyond the elastic limit led to breakage of the glass when the radius of curvature reached 12.5 cm. In a variant, the glass and metal plies were bonded together to form the laminate using a "MACBOND" (Trade Mark) double-faced adhesive sheet.

A second backing sheet 3 of similar metal was then taken and bent to form spacer lips 4 and attachment lips 5 so that the attachment lips 5 could be fixed to the free margin 6 of the first metal sheet 2, e.g. by spot welding or rivetting, to form an open-ended box.

Holes were drilled in the second backing sheet 3 to accommodate fixing bolts such as 7 and the box was then placed between a pair of dies and its interior was filled with a foam-forming material to give rise to a plastics foam 8 which rigidified the structure and embedded the heads of the fixing bolts 7. In a particular example, the foam 8 formed was a polyurethane closed cell foam whose thickness was 35 mm and which has a resistance to compression at 10% deflection of 50 N/cm$^2$ and a density of about 60 kg/m$^3$.

FIG. 2 illustrates a curved mirror which can be formed in a similar way and shows a curved glass mirror 9 bonded to a curved metal sheet 10. A second curved metal backing sheet 11 has lips 12 which rest on the edges of the first metal sheet 10 to hold them spaced apart until a rigidifying foam material 13 has been introduced into the space between the metal sheets. Fixing studs such as 14 can be welded to the second metal sheet 11 as desired for securing the composite mirror to a support.

FIG. 3 illustrates how a curved composite mirror may be formed.

In FIG. 3, a flat thin glass sheet 15 has a silvered surface which is bonded to a thin flat waterproof metal backing sheet 16 to form a flat, flexible laminate. As an example, such a laminate can be produced using a glass ply 15 0.8 mm in thickness, galvanised steel for the metal ply 16 and a hot-melt adhesive for bonding the metal ply to the coated glass. The adhesive layer may be 40 microns in thickness and be formed by a hot-melt adhesive comprising ethylene/vinyl acetate. For one laminate the steel ply had a thickness of 1 mm. It was found that the laminate could be flexed down to a radius of curvature of 18 cm. As an alternative to said bonding medium a hot-melt adhesive comprising butyl rubber and wax can be used.

This laminate is placed face down on a convex die 17 and on top of it is laid a second similar metal sheet 18. The second backing sheet 18 is provided with a plurality of metal spacer blocks 19 fixed to it. Some of the blocks 19 are threaded for the receipt of fixing bolts (not shown) so that the finished article can be fixed to a support. An upper die 20 which may be flat as shown or concave is then lowered onto the lower die 17 to define a desired thickness for the composite laminate as a whole, and foamable material is introduced into the space between the metal sheets 16, 18 under pressure. This pressure and any additional pressure due to foaming is arranged to be sufficient to force the glass sheet 15 to conform to the convex surface of the lower die 17 and to cause the upper metal sheet 18 to conform to the surface of the upper die 20.

FIG. 4 shows a heliostat comprising a support carrying mirror panels according to this invention.

The support comprises a pedestal 21 which is held upright in a foundation sunk to a suitable depth into the ground. The upper end of the pedestal 21 carries a drive mechanism 22 which supports a generally horizontal beam 23 on which are fixedly mounted four bar joists 24 to form a double H or H—H rack assembly. The drive mechanism 22 is controlled by known solar tracking control means carried by the support to pivot the beam 23 about a generally horizontal axis and about the axis of the pedestal 21. A plurality of generally rectangular composite mirror panels 25 in accordance with the invention are fixed in two columns between the bar joists 24 of the H—H rack assembly. The mirror panels 25 are all substantially identical and each is of the form produced as shown in FIG. 3.

In a specific practical embodiment, there are six such mirror panels in each of the two columns, and each mirror panel has an area of 1×3 meters. As illustrated, the mirror panels 25 have cylindrically curved mirrors, the axis of curvature of each mirror being parallel with its short sides and thus with the bar joists 24. In a variant embodiment, the bar joists, which are illustrated as being straight in FIG. 4, are curved so that the heliostat mirror formed is of facetted part-spherical form. In another variant embodiment, the mirrors panels themselves each present a part-spherical reflective surface. In yet a further variant embodiment which is particularly suitable for forming composite mirror panels of large area, the mirror is formed by a plurality of reflectively coated glass tiles bonded side by side to a common first backing sheet.

We claim:

1. A method of manufacturing a composite mirror panel comprising the steps of:
    water-tightly bonding a first backing sheet made of waterproof material to the rear side of a mirror including a vitreous sheet bearing radiation-reflecting coating on its rear side, thereby forming a mirror/backing sheet laminate;
    locating the laminate and a second backing sheet between a pair of dies with the laminate and the second backing sheet positioned in spaced relationship;
    injecting the space between the laminate and the second backing sheet with a foamable plastic material;
    allowing the foamable plastic material to foam and thereby press the laminate and the second backing sheet into close conformity with the respective die faces and,
    allowing the foam to set and adhere to each backing sheet while the laminate and second backing sheet are pressed against the die faces to form a substantially rigid composite sandwich structure.

2. The method according to claim 1, wherein said vitreous sheet has a thickness no greater than 1.5 mm.

3. The method according to claim 1, wherein each of the backing sheets has a Young's modulus of elasticity of at least 10 GN/m$^2$.

4. The method according to claim 3, wherein at least the first backing sheet is metal.

5. The method according to claim 4, wherein at least one of the backing sheets is steel.

6. The method according to claim 4 or 5, wherein the first backing sheet has a thickness in the range 0.5 to 1.0 mm.

7. The method according to claim 1, wherein the vitreous sheet and the first backing sheet are bonded together to form a flat laminate.

8. The method according to claim 7, wherein the first backing sheet and the vitreous sheet are bonded together to form a flexible laminate having a neutral bending surface lying outside the thickness of the vitreous sheet when the laminate is flexed within the elastic limit of its component sheets to form a concave reflector.

9. The method according to claim 8 wherein: one die face is convexly curved; the laminate is placed against the convexly curved die face and is forced into conformity therewith by the pressure generated during the foaming process.

10. The method according to claim 1, wherein the foamable material will generate a closed cell foam.

11. The method according to claim 1, wherein the foamable material will generate a polyurethane foam.

12. The method according to claim 1, wherein the density of the foam layer formed is between 50 and 80 kg/m$^3$.

13. The method according to claim 1, wherein the foam when set has a compressive strength at 10% deflection of at least 50 N/cm$^2$.

14. The method according to claim 1, wherein the foam when set has a compressive strength at 10% deflection of at most 200 N/cm$^2$.

15. The method according to claim 1, wherein the thickness of the foam layer formed is between 30 and 55 mm.

16. The method according to claim 1, further including the step of priming at least one of the backing sheets prior to the step of injecting the foamable plastic material to promote adhesion of the foam plastic material.

17. The method according to claim 1, including maintaining the backing sheets in spaced relation, prior to the injection of said foam, by one or more spacer members disposed therebetween.

18. The method according to claim 1, further including: prior to injection of the foamable material, maintaining the laminate and the second backing sheet in spaced apart relationship by projections formed at edges of at least one of the backing sheets.

19. The method according to claim 18, wherein the backing sheets and projections form a box structure.

20. The method according to claim 1, further including attaching a means for mounting the panel to a support to the second backing sheet.

21. The method according to claim 1, further including embedding a means for mounting the panel to a support in the foam so that the means bears on the front face of the second backing sheet.

22. A panel made by the method according to claim 1.

23. A panel made by the method according to claim 9 wherein the mirror of the panel is concavely curved.

24. The method according to claim 1, wherein each of the backing sheets has a Young's modulus of elasticity of at least 50 GN/m².

25. The method according to claim 3, wherein at least one of the backing sheets is galvanised steel.

* * * * *